(12) United States Patent
Presezzi et al.

(10) Patent No.: US 11,299,678 B2
(45) Date of Patent: Apr. 12, 2022

(54) EFFICIENT PROCEDURE AND SYSTEM TO PROCESS SOLID ORGANIC WASTE

(71) Applicant: BIOFORCE TECH CORPORATION, Newark, DE (US)

(72) Inventors: Dario Presezzi, San Francisco, CA (US); Valentino Villa, Redwood City, CA (US); Marco Mosciarello, San Francisco, CA (US); Stefano Pessina, San Francisco, CA (US); Mattia Bonfanti, Delft (NL)

(*) Notice: Subject to any disclaimer, the term of this patent is extended or adjusted under 35 U.S.C. 154(b) by 0 days.

(21) Appl. No.: 16/645,160

(22) PCT Filed: Aug. 28, 2018

(86) PCT No.: PCT/US2018/048377
§ 371 (c)(1),
(2) Date: Mar. 6, 2020

(87) PCT Pub. No.: WO2019/050716
PCT Pub. Date: Mar. 14, 2019

(65) Prior Publication Data
US 2021/0032542 A1 Feb. 4, 2021

Related U.S. Application Data

(60) Provisional application No. 62/554,601, filed on Sep. 6, 2017.

(51) Int. Cl.
*C10B 53/00* (2006.01)
*B01D 53/84* (2006.01)
(Continued)

(52) U.S. Cl.
CPC .............. *C10B 53/00* (2013.01); *B01D 53/84* (2013.01); *B09B 3/0083* (2013.01); *C10B 27/06* (2013.01); *C10B 41/00* (2013.01); *C10B 57/10* (2013.01)

(58) Field of Classification Search
None
See application file for complete search history.

(56) References Cited

U.S. PATENT DOCUMENTS 4,078,973 A   3/1978   Choi et al.
4,465,556 A   8/1984   Bowen et al.
(Continued)

FOREIGN PATENT DOCUMENTS

CN   105199757   12/2015
CN   105907406   8/2016

OTHER PUBLICATIONS

Arsenijevic, Z, et al. Drying of Solutions and Suspension in the Modified Spouted Bed with Draft Tube, 2002, Thermal Science, vol. 6, pp. 47-70. (Year: 2002).*

*Primary Examiner* — Jonathan Miller
(74) *Attorney, Agent, or Firm* — Law Offices of Steven W. Weinrieb (57) ABSTRACT

The techniques introduced here include a system and method for efficiently, and in some embodiments automatically, processing solid organic waste. In both the method and the system the solid organic waste is injected into a rotating, thermally isolable, container with internal sensors that help in keeping humidity and temperature within given parameters, before the resulting dried solid organic waste is sent to a pyrolysis chamber and its exhausts are sent to filter. In some embodiments, inert material in the form of dried solid organic waste is left in the container in order to make the process even more efficient and system and process are made (Continued)

automatic and remotely controllable through the use of software automation and a web of internal and external sensors.

6 Claims, 5 Drawing Sheets

(51) Int. Cl.
    *B09B 3/00*           (2022.01)
    *C10B 27/06*         (2006.01)
    *C10B 41/00*         (2006.01)
    *C10B 57/10*         (2006.01)

(56) References Cited

U.S. PATENT DOCUMENTS

| | | | |
|---|---|---|---|
| 5,321,191 A | | 6/1994 | Alagy et al. |
| 5,409,834 A | * | 4/1995 | Birdwell ................ B01D 53/84 |
| | | | 435/294.1 |
| 5,725,738 A | | 3/1998 | Brioni et al. |
| 6,558,644 B1 | | 5/2003 | Berman |
| 6,861,169 B2 | | 3/2005 | Hagan et al. |
| 2011/0089015 A1 | | 4/2011 | Kelley |
| 2012/0285080 A1 | * | 11/2012 | Despen ..................... C10L 5/36 |
| | | | 44/500 |

* cited by examiner

EFFICIENT PROCEDURE AND SYSTEM TO PROCESS SOLID ORGANIC WASTE

FIELD OF THE INVENTION

Various embodiments of the present invention generally relate to the efficient processing of solid organic waste.

BACKGROUND OF THE INVENTION

In the past, various attempts have been made to find a way to process solid organic waste in an efficient manner. In fact, it had been discovered that solid organic waste could be disposed of and re-utilized by exploiting the heat that solid organic waste itself generates given certain conditions.

The main problem of the solutions discovered in the past was that no system or method was really economically viable. In fact, the containers where the solid organic waste was put could not achieve and/or maintain the right temperature or the right level of humidity. Moreover, keeping trace of all the parameters to be controlled within the container was burdensome and not always feasible, so that the heat generated by the solid organic waste was either too much or insufficient.

Moreover, such processes, in order to exploit the heat generated by the waste, were actually wasting more energy than they could save just to keep the temperature and the humidity at the right level within the container, due to an inefficient insulation and to mechanisms that were not apt to completely exploit and enhance the natural properties of the solid organic waste.

SUMMARY OF THE INVENTION

Embodiments of the disclosure include a method to automatically and efficiently process solid organic waste exploiting the natural characteristics of the waste. Such method may be performed through the injection of solid organic waste in a thermally isolable container while keeping the temperature in the container between 30 and 85° C. and the level of humidity between 10 and 85. In an embodiment of the disclosure, such method also involves conveying a resulting dried solid organic waste in a separate chamber where it is processed through pyrolysis while sending exhausts resulting from the above described processing to a filter. In an embodiment of the disclosure, charcoal is obtained at the end of the process.

Embodiments of the disclosure may further include the monitoring of internal temperature and humidity through sensors placed in a rotable and remotely controlled container. In some of the embodiments, there is no need to pre-mix the solid organic waste with inert material because inert material is already present in the container and, in some embodiments, such inert material is constituted by the resulting organic waste of a previous cycle of processing itself.

Embodiments of the disclosure also include a system to efficiently process solid organic waste that involves the use of solid organic waste and of a thermally isolable container to dry the solid organic waste and to obtain a resulting dried solid organic waste, which is then processed thanks to a pyrolysis chamber. In such embodiment, the exhaust of the resulting dried solid organic waste is sent to a filter. In one of the embodiments of the disclosure the container may further be equipped with sensors to monitor its humidity and temperature, which are regulated remotely thanks to a processing machine programmed with set parameters. One of the embodiments may further comprise a heat exchanger that cools the exhausts coming from the container with the cold air that is introduced from outside and may also comprise a rotable container that can be remotely controlled and which is pre-filled with resulting solid organic waste that acts as inert material.

This Summary is provided to introduce a selection of concepts in a simplified form that are further described in the Detailed Description and drawings. This Summary is not intended to identify essential features of the claimed subject matter or to limit the scope of the claimed subject matter.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

As already mentioned in the Background, systems and methods for processing solid organic waste have been introduced since a long time ago, but they were often extremely inefficient. The inefficiency was due to several factors, amongst which the impossibility to adequately control the level of temperature and humidity inside the container of solid organic waste and the waste of energy and resources to re-introduce inert material in the container of solid organic waste. Such and other inefficiencies led to the consumption, by the systems and methods of processing solid organic waste, of significantly more energy than the one which is produced.

The present disclosure aims at solving the aforementioned inefficiency problem.

Figure 1:
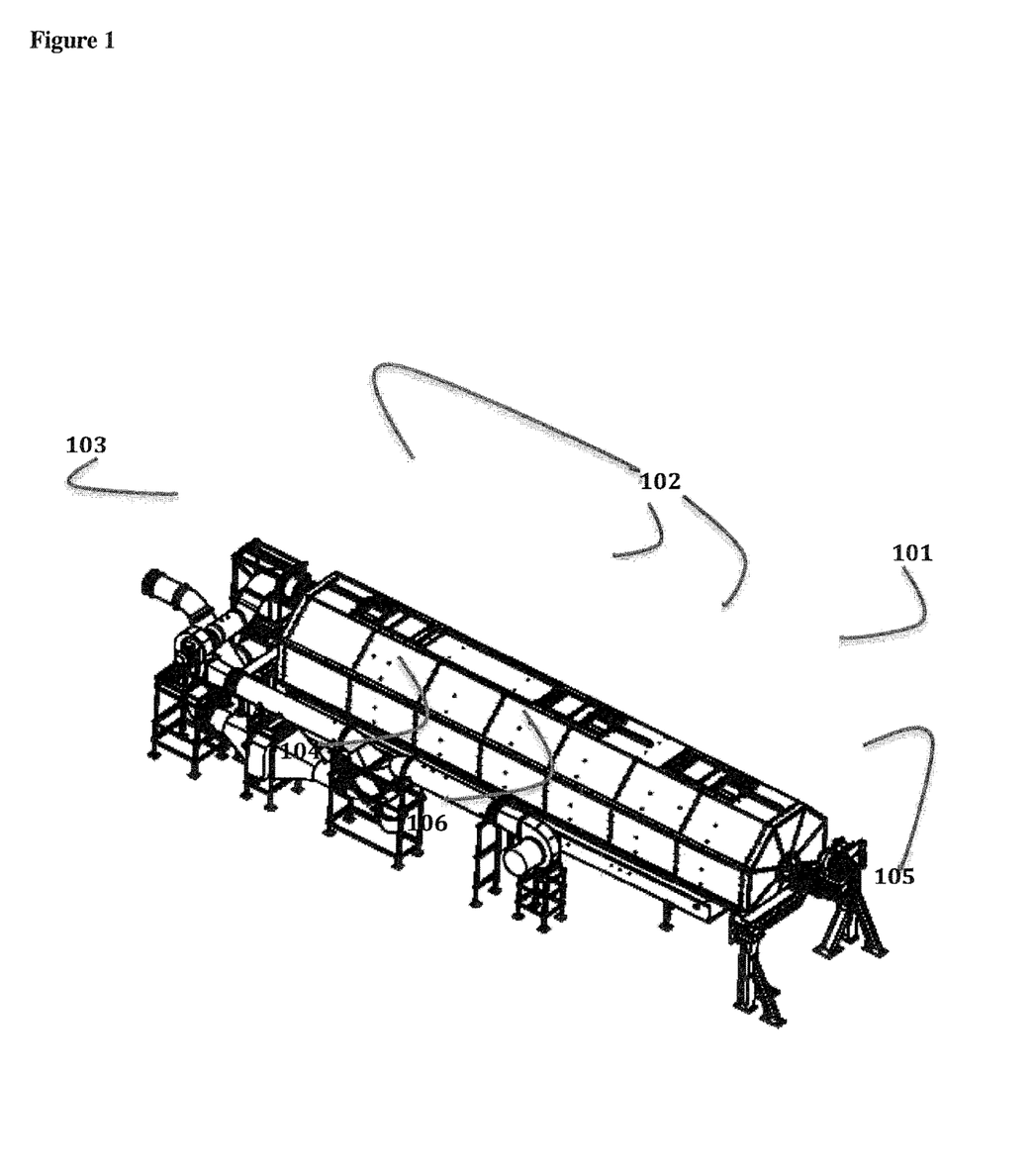
FIG. 1 provides an illustrative representation of a container that can be used for processing solid organic waste.
Figure 2:
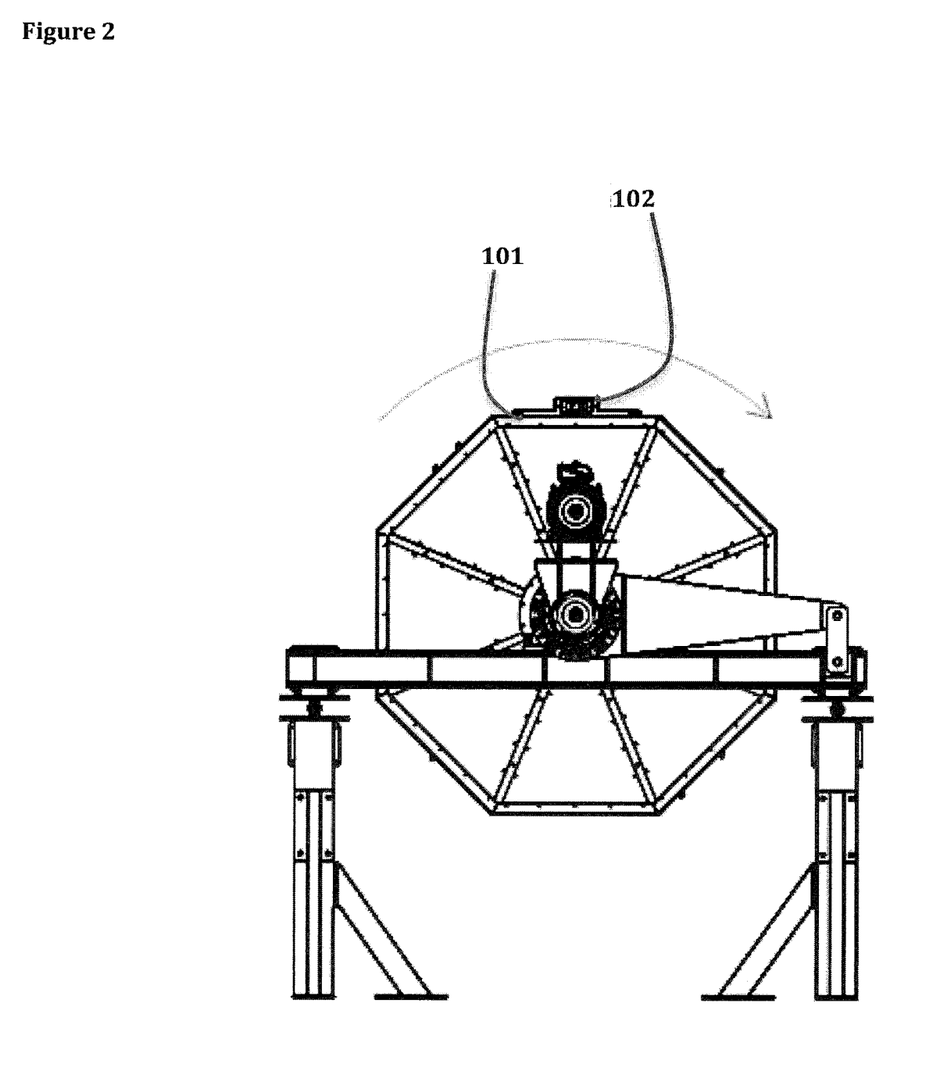
FIG. 2 shows the container from a different angle, in which it can be appreciated its rotative capability.
Figure 3:
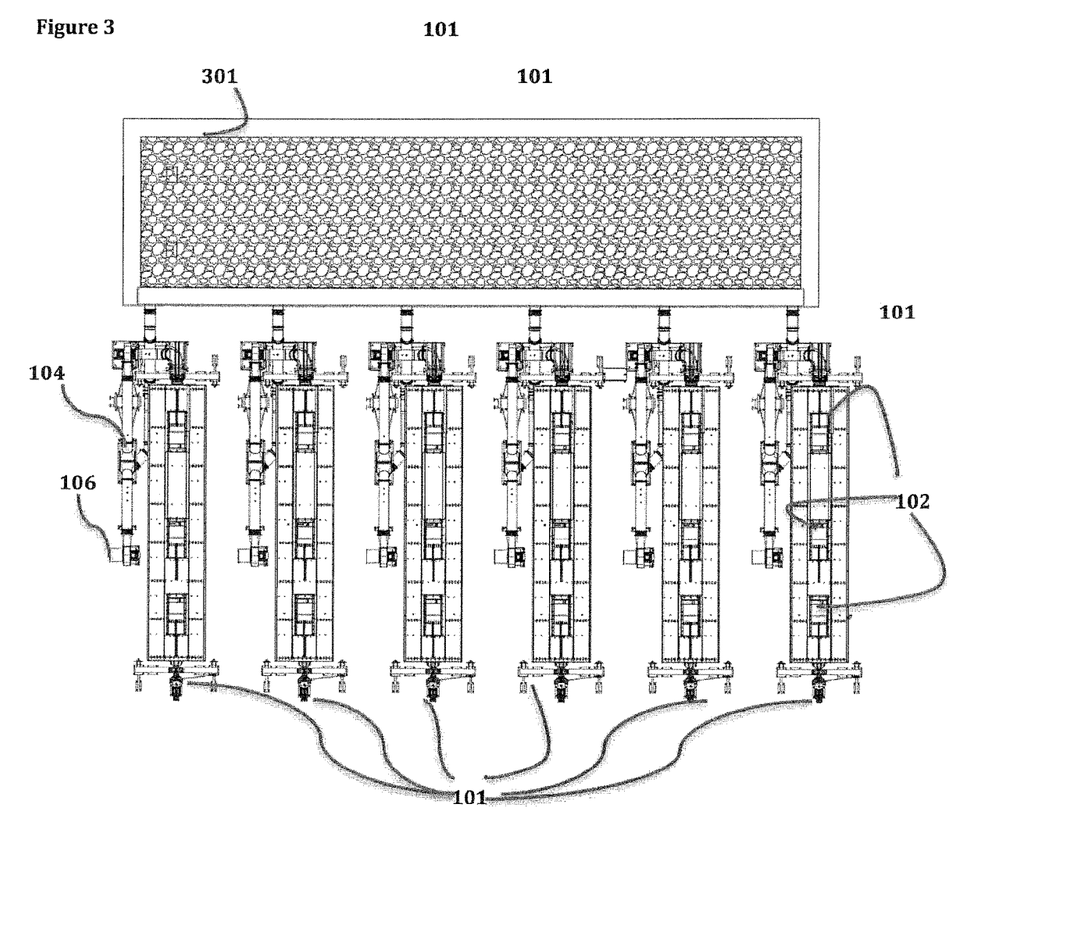
FIG. 3 illustrates of the combination of a container to process solid organic waste, filter and pyrolysis chamber, exchanger and other components connected to the above.

One of the embodiments of the present disclosure include a method to automatically and efficiently process solid organic waste by exploiting the natural characteristics of the waste, and in particular its changeable temperature and humidity. Such method may be performed through the injection of solid organic waste in a thermally isolable container 101 while keeping the temperature in the container between 30 and 85° C. and the level of humidity between 10% and 85%. In an embodiment of the disclosure, such method involves conveying a resulting dried solid organic waste in a separate chamber where it is processed through pyrolysis while sending exhausts resulting from the above described processing to a filter 301. In an embodiment of the disclosure, charcoal is obtained at the end of the process.

Embodiments of the disclosure may further include the monitoring of internal temperature and humidity through sensors placed in a rotable and remotely controlled container. In such embodiments of the disclosure, a set of parameters based on which humidity and temperature is adjusted is set in advance, so that when temperature and humidity exceed or drop below the standards that have been set of 35 and 85° C. and the level of humidity between 10% and 85% respectively, temperature and humidity are immediately brought back to the optimal set condition. In some of the embodiments, the temperature of the solid organic waste may be regulated also through the help of a heat exchanger 104 connected to the container 101. In some embodiments, the heat exchanger 104 is also used to cool the exhausts resulting from the drying process inside the container 101 before they are sent to the filter 301, so that their temperature is not too high for the filter 301. The heat exchanger in some embodiments is used both to cool the temperature of the exhausts and in parallel to adjust the temperature of the inside of the container 101, either increasing it or decreasing it.

Figure 4:
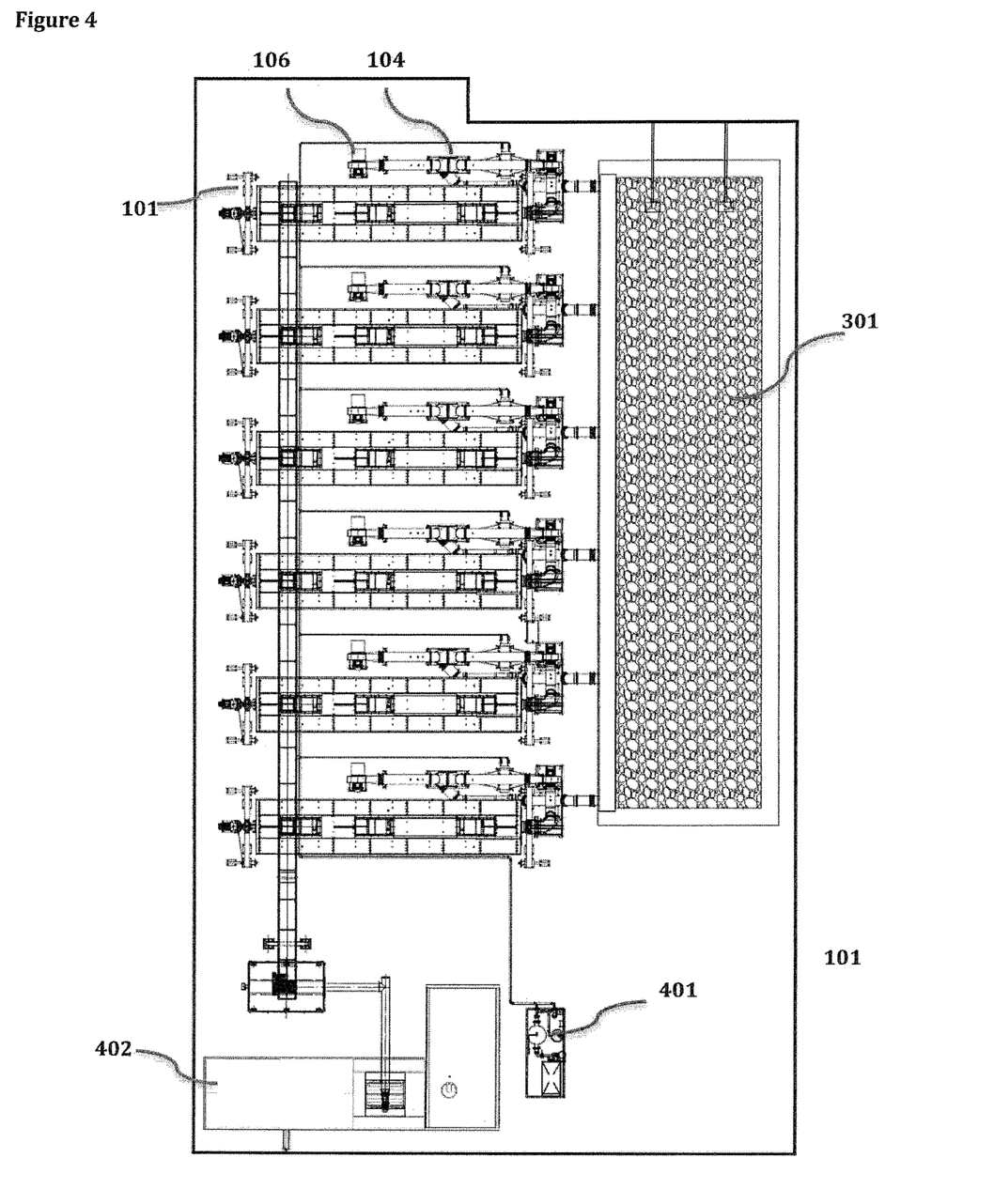
FIG. 4 provides an illustrative representation of a container to process solid organic waste, filter and pyrolysis chamber, exchanger and other components connected to the above, with a complete overview over the sold organic waste process and system.

In some of the embodiments, there is no need to pre-mix the solid organic waste with inert material because inert material is already present in the container 101 and, in some embodiments, such inert material is constituted by the resulting dried solid organic waste of a previous cycle of processing itself. This method allows to save both time and energy by making the process extremely efficient. In some embodiments of the disclosure, sensors to monitor the right quantity of resulting solid organic waste are installed within the rotable container 101 so that the right amount of resulting dried solid organic waste, which may range between 0 and 50% of the resulting dried solid organic waste, is automatically left into the container 101 after the originally inserted solid organic waste is dry enough that it can be sent to the pyrolysis chamber 402. In such embodiments, the level of dryness of the solid organic waste which is inserted in the container 101 is monitored through sensors placed in the container 101 so that the inside of the container 101 does not have to be constantly checked from the outside, wasting energy and unbalancing the inside temperature.

In one of the embodiments of the disclosure, charcoal is obtained after the dried solid organic waste is sent to the pyrolysis chamber 402. In one of the embodiments of the disclosure the filter 301 is a biofilter and the resulting dried solid organic waste, after it is sent to the pyrolysis chamber 402, is transformed in biochar In some of the embodiments of the disclosure, the container 101 is rotated throughout the process in order to keep the levels of humidity and temperature between the optimal ranges indicated above and thanks to the sensors installed in the container 101 the rotation happens not only at pre-fixed times but also automatically when there is a need to rotate.

Embodiments of the disclosure also include a system to efficiently process solid organic waste that involves the use of solid organic waste and of a thermically isolable container to dry the solid organic waste and to obtain a resulting dried solid organic waste, which is then sent to through a pipe 105 and processed thanks to a pyrolysis chamber 402. In such embodiment, the exhausts of the resulting dried solid organic waste is sent, through a dedicated pipe 103, to a filter 301. In one of the embodiments of the disclosure the container 101 may further be equipped with sensors to monitor its humidity and temperature, which are regulated remotely thanks to a processing machine programmed with set parameters 503. One of the embodiments may further comprise a heat exchanger 104 that cools the exhausts coming from the container 101 with the cold air that is introduced from outside through a ventilator 106 and may also comprise a rotable container 101 that can be remotely controlled and which is pre-filled with resulting solid organic waste that acts as inert material.

In one of the embodiments of the disclosure the container has multiple openings 102 to allow the injection of solid organic waste from three different positions, so that the solid organic waste is better distributed inside the container 101. In one of the embodiments of the disclosure, there are multiple containers 101 to process solid organic waste, all connected to the same pyrolysis chamber 402 and to the same filter 301

In one of the embodiments of the disclosure, a heat exchanger 104, through which an external air used to lower the internal temperature of the container and the exhaust resulting from the treatment of the solid organic waste are respectively, and automatically, heated and cooled, is protected by a metallic net where the air enters in the container. The metallic net allows the pipes that work together with the heat exchanger to remain cleaner and it reduces the need to manually or automatically clean the pipes itself, making the process and system even more efficient.

In one of the embodiments of the disclosure, an emergency heater 401 is envisaged, so that if the temperature inside, the container 101 drops below the indicated optimal range, the inside temperature can be brought back inside the range. In some embodiments of the disclosure, thanks to sensors installed inside the container, as soon as the temperature is detected to be outside the optimal range, air from outside pulled by a ventilator 106 goes through the heat exchanger 104 and is injected into the container 101 if the temperature is higher than it should be or extra hear from the emergency heater 401 is conveyed to the containers if temperature is below the optimal range.

Figure 5:
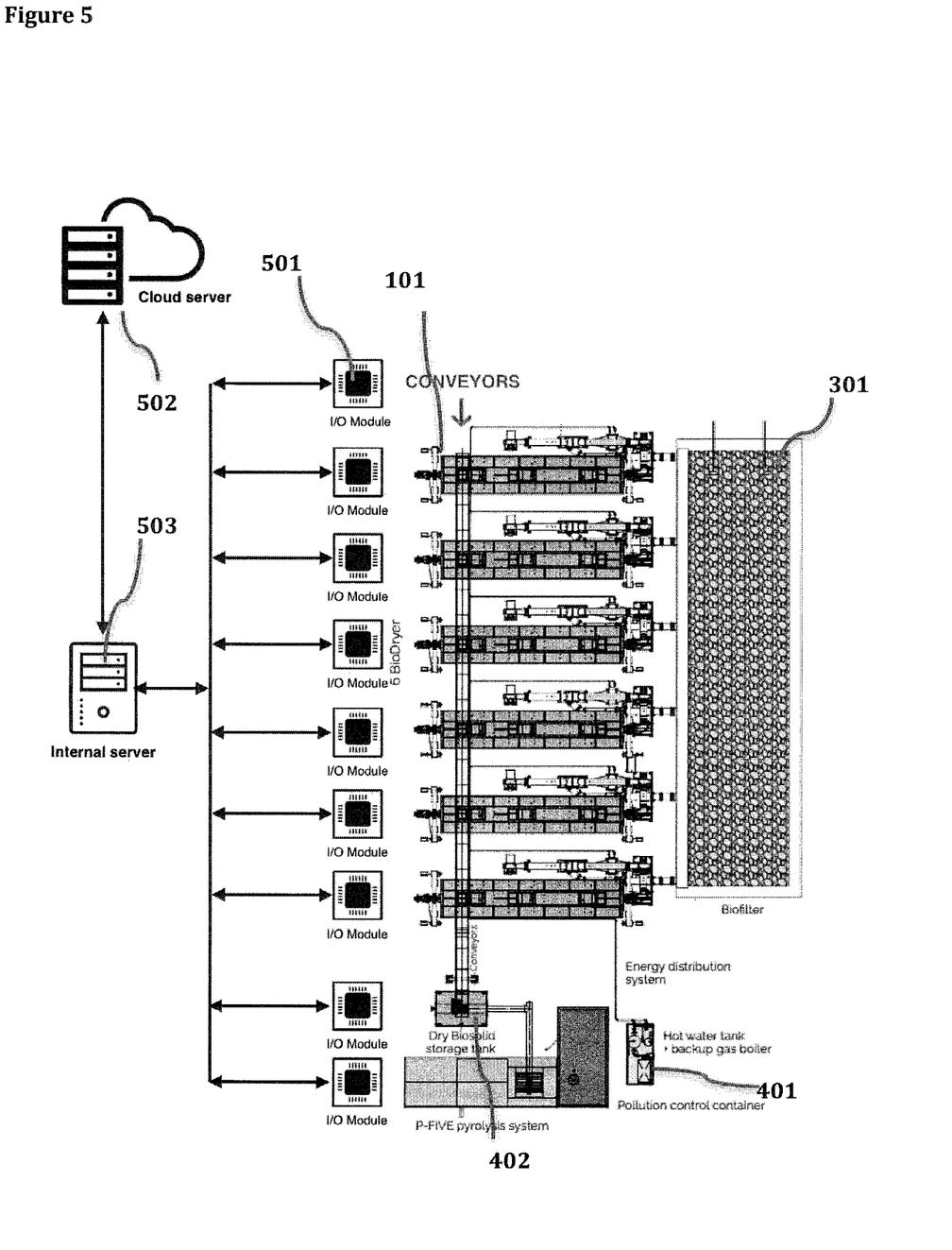
FIG. 5 illustrates a possible embodiment of the disclosure in which the processing of solid organic waste is automated and remotely controlled.

In one of the embodiments of the disclosure, the system and method are completely automated from the injection of the solid organic waste into the containers 101 through the openings 102 to obtaining charcoal, even in the form of biochar. The automation takes place through sensors positioned inside and outside the container 101 that monitor internal and external temperature, humidity, quantity of solid organic waste, quantity of resulting dried solid organic waste, and that are connected to I/O modules 501 connected to one or more rotating containers 101. In some embodiments, such I/O modules 501 collect data from external and internal sensors and send the data to a server 503 every 200 m/s for complex elaborations, and based on such elaborations the rotation of the container 101, the intake of air through the ventilator 106, and in case through the heat exchanger 104, the passage through the heat exchanger of the exhausts, the conveyance of resulting dried solid organic waste to the pyrolysis chamber 402, the quantity of resulting dried solid organic waste that has to remain the container 101 as inert material, the delivery of extra heat from the emergency heater 401 into the container 101, and in any case each operation which involves any sort of measurement, are regulated. In some embodiments of the disclosure, the server 503 and the I/O modules 501 are connected to an external cloud 502 for predictive maintenance, long-term data recording and alarm messages.

In one of the embodiments of the disclosure the server 503 operates through PHP algorithms to control the I/O modules 501. In such embodiment the server 503 manages all the components through the sensors and connects every container 101 and every other component of the system and method together. In some embodiments, every second a script elaborates data and changes the system parameters in order to optimize the process efficiency, material flow and energy use.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or sub-combinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

What is claimed is:

1. A method to process solid organic waste comprising the steps of:
   depositing a predetermined amount of dried solid organic waste into a thermally isolated container;
   injecting a predetermined amount of wet solid organic waste into said thermally isolated container;
   rotating said thermally isolated container so as to thoroughly mix said predetermined amount of dried solid organic waste with said predetermined amount of wet solid organic waste;
   conducting an air flow through said thermally isolated container so as to permit bacteria, present within said mixture of said dried solid organic waste and said wet solid organic waste, to generate heat as said bacteria present within said mixture of said dried solid organic waste and said wet solid organic waste metabolizes and thereby raises temperature levels internally within said thermally isolated container to a temperature level which is between 35° C. and 85° C., and which raises and humidity levels internally within said thermally isolated container to a humidity level which is between 10% and 85%;
   providing a plurality of temperature and humidity sensors within said thermally isolated container so as to monitor temperature and humidity conditions inside said thermally isolated container and generate data indicative of said temperature and humidity conditions inside said thermally isolated container;
   monitoring said plurality of said temperature and humidity sensors within said thermally isolated container, and automatically rotating said thermally isolated container as well as automatically controlling said air flow into said thermally isolated container, in response to said generated temperature and humidity data, so as to maintain said temperature level within said thermally isolated container between 35° C. and 85° C., and said humidity level within said thermally isolated container between 10% and 85%, in accordance with data provided by said plurality of temperature and humidity sensors so as to eventually result in obtaining dried solid organic waste; and
   conveying said resulting dried solid organic waste into a separate chamber where said resulting dried solid organic waste is processed by means of pyrolysis so as to obtain charcoal.

2. The method as in claim 1, wherein:
   exhaust from said thermally isolated container is sent to a biofilter.

3. The method as in claim 1, wherein:
   external air is routed through a heat exchanger so as to lower said temperature level internally within said thermally isolated container.

4. The method as in claim 1, wherein:
   a part of said resulting dried solid organic waste is left in said thermally isolated container, instead of being processed through pyrolysis, so as to act as said dried solid organic waste material for a subsequent processing cycle.

5. The method as in claim 1, wherein:
   said temperature level and said humidity level within said thermally isolated container is remotely regulated.

6. The method as set forth in claim 1, wherein said pyrolysis further comprises the steps of:
   conveying said resulting dried solid organic waste into a pyrolysis hopper;
   conveying a predetermined amount of said resulting dried solid organic waste from said pyrolysis hopper into a pyrolysis reactor which is thermally isolated from external ambient conditions;
   maintaining said pyrolysis reactor at a temperature level of between 400° C. and 800° C.; and
   maintaining said predetermined amount of said resulting dried solid organic waste within said pyrolysis reactor for a time period of between two (2) and thirty (30) minutes.

* * * * *